(12) United States Patent
McGrath et al.

(10) Patent No.: US 7,496,966 B1
(45) Date of Patent: Feb. 24, 2009

(54) METHOD AND APPARATUS FOR CONTROLLING OPERATION OF A SECURE EXECUTION MODE-CAPABLE PROCESSOR IN SYSTEM MANAGEMENT MODE

(75) Inventors: Kevin J. McGrath, Los Gatos, CA (US); David S. Christie, Austin, TX (US); Geoffrey S. Strongin, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1040 days.

(21) Appl. No.: 10/419,120

(22) Filed: Apr. 18, 2003

Related U.S. Application Data (60) Provisional application No. 60/373,571, filed on Apr. 18, 2002.

(51) Int. Cl.
G06F 7/04 (2006.01)
G06F 12/00 (2006.01)
(52) U.S. Cl. .......................... 726/27; 711/100; 711/145
(58) Field of Classification Search ................. 711/163, 711/206, 100, 145; 713/188; 726/27
See application file for complete search history.

(56) References Cited

U.S. PATENT DOCUMENTS

| | | | | |
|---|---|---|---|---|
| 5,692,211 A | * | 11/1997 | Gulick et al. | 712/35 |
| 5,758,177 A | * | 5/1998 | Gulick et al. | 712/1 |
| 5,784,592 A | * | 7/1998 | Gulick et al. | 710/300 |
| 5,860,144 A | * | 1/1999 | Frank et al. | 711/206 |
| 5,873,127 A | * | 2/1999 | Harvey et al. | 711/206 |
| 5,987,582 A | * | 11/1999 | Devic | 711/206 |
| 5,987,604 A | | 11/1999 | Edrich | |
| 6,073,226 A | * | 6/2000 | Cutshall et al. | 711/203 |
| 6,327,652 B1 | | 12/2001 | England et al. | |
| 6,330,670 B1 | | 12/2001 | England et al. | |
| 6,477,612 B1 | * | 11/2002 | Wang | 711/2 |
| 6,651,171 B1 | * | 11/2003 | England et al. | 713/193 |
| 6,854,046 B1 | | 2/2005 | Evans et al. | |
| 2002/0002673 A1 | | 1/2002 | Narin | |
| 2003/0101322 A1 | * | 5/2003 | Gardner | 711/163 |
| 2003/0200402 A1 | | 10/2003 | Willman et al. | |
| 2003/0200405 A1 | | 10/2003 | Willman et al. | |

FOREIGN PATENT DOCUMENTS

EP  1 209 563 A2  11/2001

OTHER PUBLICATIONS

U.S. Appl. No. 10/419,084.
U.S. Appl. No. 10/429,132.
U.S. Appl. No. 10/654,734.

(Continued)

*Primary Examiner*—Nasser G Moazzami
*Assistant Examiner*—Mohammad W Reza
(74) *Attorney, Agent, or Firm*—Meyertons Hood Kivlin Kowert & Goetzel, P.C.; Stephen J. Curran; B. Noël Kivlin (57) ABSTRACT

A method for controlling operation of a secure execution mode-capable processor includes receiving access requests to a plurality of addressable locations within a system memory. The method may further include preventing the access requests from completing in response to determining that the secure execution mode-capable processor is operating in a secure execution mode.

15 Claims, 4 Drawing Sheets

OTHER PUBLICATIONS

U.S. Appl. No. 10/419,085.
U.S. Appl. No. 10/419,086.
U.S. Appl. No. 10/419,038.
U.S. Appl. No. 10/419,083.
U.S. Appl. No. 10/419,090.
U.S. Appl. No. 10/419,121.
U.S. Appl. No. 10/419,091.
U.S. Appl. No. 10/419,122.
"Microsoft Scheme for PC Security Faces Flak", Merritt, *EE Times*, Issue 1227, Jul. 15, 2002.

\* cited by examiner

METHOD AND APPARATUS FOR CONTROLLING OPERATION OF A SECURE EXECUTION MODE-CAPABLE PROCESSOR IN SYSTEM MANAGEMENT MODE

This application claims the benefit of U.S. Provisional Application No. 60/373,571 filed Apr. 18, 2002.

BACKGROUND OF THE INVENTION

1. Field of the Invention

This invention relates to computer systems employing secure execution mode-capable processors and, more particularly, to controlling the secure execution mode-capable processor in system management mode.

2. Description of the Related Art

Modern computer systems are revolutionizing the way people live. This is particularly true for system platforms including microprocessors employing the x86 system architecture. The openness of x86-based systems to a myriad of owner-installable third-party peripheral devices and applications has enabled a broad marketplace of hardware and software vendors that has fostered competition, innovation, and evolution. An example of such evolution is the now widespread use of the platform as a digital communication and media system of ever-increasing quality and capability. In concert with the Internet, these system platforms are clearly revolutionizing mass distribution of digital content, allowing on-demand access to newspapers, real-time weather conditions and radio stations from around the world, on-line banking and shopping, and audio and video-based entertainment.

Since the x86 platform is an open architecture, devices typically have vendor-supplied drivers which run in Kernel mode in order to access the devices, and certain software applications may include Kernel mode components. Thus, although the open architecture may have advantages and may still provide a large degree of protection against accidental interference of one application with another, the current architectural protection mechanisms may be exposed in this environment to unwanted manipulation.

Computer systems including microprocessors employing the x86 architecture include features designed to protect against applications interfering with each other. For example, x86-based operating systems rely on two features of the x86 Protected mode architecture to provide an environment where applications are isolated from each other, and critical operating system code and data is isolated from applications: 1) paged virtual memory, and 2) execution privilege level.

Paged virtual memory allows the Operating System (OS) to define a separate virtual address space for each application, and to selectively map individual pages of physical memory into each of those virtual address spaces through a set of address translation tables. This provides each application with its own private section of physical memory for code and data that may be inaccessible to other applications. The virtual memory mechanism may also allow the OS to selectively map pages of physical memory into multiple virtual address spaces, and to selectively designate such pages in virtual space as read-only. This shared mapping capability may also allow a copy of the OS Kernel itself to reside in each application's address space, and may likewise allow shared mappings of peripheral device access ports and associated device driver routines, thus providing applications with efficient access to OS services without requiring costly address space switches. But the OS portion of the address space necessarily includes system data areas that OS code must be able to modify, and which must still be protected from application code. The read-only designation may not provide proper protection for such areas.

The x86 architecture also defines four privilege levels, 0 through 3, which are assigned to regions of code by the OS and kept in code segment descriptors. Typically, the privilege level of currently executing code or procedure will be stored as the Current Privilege Level (CPL). Thus the privilege levels are commonly referred to as CPL0 through CPL3. Using these privilege levels, certain system resources are accessible only to code executing at the proper level. The paged virtual memory architecture may allow access to pages of virtual memory to be restricted by privilege level. Although four privilege levels are defined, only the CPL0 and CPL3 levels are typically used by mainstream operating systems because the paged virtual memory architecture does not distinguish CPL1 or CPL2 from CPL3. CPL0 is commonly referred to as Kernel mode and is the most privileged level, while CPL3 is commonly referred to as User mode and is the least privileged level. OS code and data are typically assigned to CPL0 while application code and data are assigned to CPL3. CPL0 execution privilege does not override read-only protection; the two attributes are independent. Code segment descriptors are used to assign these levels.

In addition to this memory protection, all processor control registers, including those that control virtual memory operation, are by architectural definition accessible only at CPL0. In addition, special control transfer instructions are typically required to switch execution from one segment to another, and hence to switch privilege levels. These instructions allow the OS to limit the targets of such control transfers to specific entry points in OS-controlled code, hence an application may not change privilege level without simultaneously handing control over to the OS.

The isolation of address spaces from each other, and of OS memory from applications, may be completely controlled by the contents of the virtual memory address translation tables. The translation tables define the virtual-to-physical page mappings that isolate one application's memory from another's, and also the read-only and privilege level attributes that protect shared libraries and the OS. The tables themselves are memory-resident data structures, and contain translation entries that map them into the shared OS memory area and restrict access to them to Kernel mode code.

The existing protection mechanisms would seem to provide adequate protection for applications and the operating system. In a well-behaved system, (e.g. correct application of these mechanisms by the operating system, and correct operation of the OS code that controls these mechanisms, and that all other code which runs in Kernel mode does not interfere with this) they do. However, typical x86-based systems include such a large amount of Kernel-mode code, not just from the OS vendors but from many independent sources, that it may be impossible for anyone to assure that such interference, whether accidental or otherwise cannot occur. Further, it is possible that operational modes such as the System Management Mode (SMM) that bypass the virtual memory protection mechanisms and access system memory directly may compromise sensitive system data.

Depending on the type of operation that a user is performing and the type of software application that is running, information stored within or running on the computer system may be vulnerable to outside access. Thus, it may be desirable to improve security and thereby possibly make x86 architecture systems less vulnerable to such access.

SUMMARY OF THE INVENTION

Various embodiments of a method for controlling a secure execution mode-capable processor are disclosed. In one embodiment, the method may include receiving access requests to a plurality of addressable locations within a system memory. The method may further include preventing the access requests from completing in response to determining that the secure execution mode-capable processor is operating in a secure execution mode.

In one specific implementation, the method may also include organizing the plurality of addressable locations into a plurality of physical pages. In addition, the method may include maintaining a data structure including a plurality of bits and each of at least a subset of the physical pages corresponds to a respective one of the bits. Further, the method may include preventing a given access request to a particular one of the physical pages from completing in response to determining that a corresponding respective bit is asserted and that the secure execution mode-capable processor is operating in a system management mode with system paging disabled.

In another embodiment, a method of controlling a secure execution mode-capable processor may include operating the secure execution mode-capable processor in a system management mode and receiving a write access request to a control register such as CR3. The method may further include preventing the write access request from completing in response to determining that the write access request is not valid in response to the secure execution mode-capable processor operating in a secure execution mode.

In one implementation, the method may include maintaining a root page data structure including a plurality of bits, wherein each bit is indicative of whether a page table base pointer points to a valid root page. In addition preventing the write access request from completing may include determining that the page table base pointer included in a given write access request does not point to a valid root page.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview of a Secure Computing Platform

Trusted computing enables computer system (e.g., personal computer (PC)) users to participate in new activities such as downloading electronic cash and movies while at the same time being protected from attacks on their privacy. To be part of a trusted computing environment, the PC itself must be trusted by both the user and outside entities such as banks and content providers, for example. Critical elements which may be necessary to create a trusted PC include: a trusted processing environment, platform-specific secrets, cryptographic processing, secure storage and a secure operating system code segment referred to as a Security Kernel (SK). The building blocks to implement these elements will be described in greater detail below.

Processors configured to execute x86 instructions generally include architectural features such as Protected mode, which provides for paged virtual memory and privileged execution modes, and the set of control registers which controls these features. Controlling access to those control registers and page tables may provide additional protection from unauthorized access to program code and data within a computer system. Thus, adding a set of architectural extensions to such processors and corresponding software support may provide this protection. The overall security enhancements to a processor may be referred to as a Secure Execution Mode (SEM). Secure Execution Mode (SEM) is a new operating mode added to a processor that creates a trusted execution environment in which a Security Kernel can run free from external tampering.

Accordingly, a processor capable of operating in SEM may include security hardware which, when enabled by SEM, provides support for SEM operating modes such as a trusted execution (TX) mode of operation, for example. As will be described further below, the trusted execution mode may include, depending on what software is executing and its privilege level, the SEM-capable processor operating in a secure user mode and a secure kernel mode in addition to the normal user mode and normal kernel mode. Mechanisms may also be provided to create a protected memory region that may only be accessible by software running within this environment and to prevent certain hardware memory accesses (e.g., direct memory access (DMA)).

The new Trusted Execution environment (TX) is somewhat analogous to the traditional normal/protected mode (CPL3/CPL0) mechanism used to separate User and Kernel environments. As described in greater detail below in conjunction with the description of FIG. 1, the combination of User/Kernel modes with trusted/non-trusted modes creates a four-quadrant model. Thus, an SEM-capable CPU contains the hardware mechanisms that create and enforce the TX mode.

Figure 1:
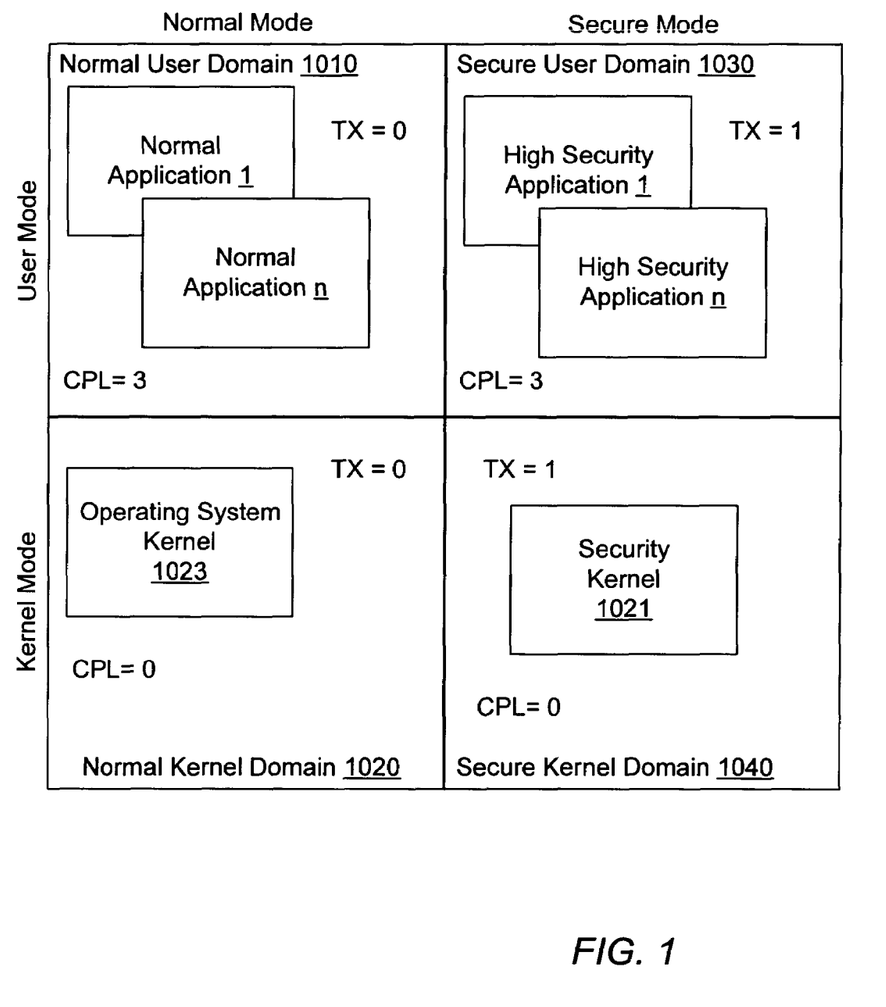
FIG. 1 is a diagram illustrating the operational domains of one embodiment of a secure execution mode-capable processor and the behavior of code operating in those domains.

Turning now to FIG. 1, a diagram illustrating the operational domains of one embodiment of a secure execution mode-capable processor and the behavior of code operating in those domains is shown. As described above, current x86-based operating systems typically use two of the four available privilege levels (e.g., CPL0 and CPL3) to implement two modes within a normal execution mode or protection domain: Normal Kernel Mode and Normal User Mode. The SEM enhancements, when SEM is enabled, define a new execution mode which is referred to as trusted execution (TX) mode. When combined with the existing normal execution mode protection domains, TX mode creates the four distinct modes or software operational domains described below. In the illustrated embodiment, the four domains are normal user (NU) domain 1010, normal kernel (NK) domain 1020, secure user (SU) domain 1030 and secure kernel (SK) domain 1040. It is noted that as used herein, secure execution mode refers to any mode of processor execution during which SEM is enabled, irrespective of whether the processor is operating in TX mode. It is further noted that as used herein, non-secure execution mode refers to any mode of processor execution during which SEM is disabled.

The NU 1010 domain may be characterized by a processor running in normal user mode (i.e. CPL=3) and not in trusted execution (TX) mode. In the NU 1010 domain, typical virtual memory settings allow for normal operation of unmodified applications. Under SEM, such applications are however prevented from accessing the memory of applications residing in the SU domain 1030, or the memory containing Security Kernel 1021 in the SK domain 1040. Further, such applications are prevented from accessing the memory of the OS Kernel 1023 or device drivers in the Normal Kernel domain 1020 by existing protection logic mechanisms such as U/S and R/W page attributes for example (not shown).

In the NK domain 1020, SEM allows for normal operation of unmodified OS Kernel 1023 components and kernel-mode device drivers. Code executing in this domain may access objects in the NU domain 1010, but is prevented under SEM from accessing objects in either the SU domain 1030 or the SK domain 1040. Further, the NK domain 1020 may be characterized by a processor running in Normal Kernel mode (i.e. CPL=0) but not in TX mode. When paging is enabled in the NK domain 1020, a processor may sometimes be referred to as operating in a Native kernel mode.

In the SU domain 1040, SEM may allow a new type of application software such as high security application (HSA) 1, for example to run. HSA software may be prevented from accessing objects in any other domain by existing x86 page protection and page mapping mechanisms. In addition, the HSAs are protected from unauthorized access by any code executing in the NU domain 1010 and the NK domain 1020, including the operating system kernel 1023 and device drivers (not shown in FIG. 2). As will be described in greater detail below, Security Kernel 1021 may be responsible for setting up and maintaining the virtual address spaces of HSAs. Further, the SU domain 1040 may be characterized by a processor running in User mode (i.e. CPL=3) but also in TX mode, which may also be referred to as a secure user mode.

In the SK domain 1040, SEM may allow Security Kernel 1021 full access to all platform resources and in addition may give exclusive control of those resources to Security Kernel 1021. The SK domain 1040 may be characterized by a processor running in Kernel mode (i.e. CPL=0) and also in TX mode, which may also be referred to as a secure kernel mode.

Generally speaking, Security Kernel 1021 is software which runs in the trusted execution (TX) mode. In one embodiment, Security Kernel 1021 may be the only software that runs in SK domain 1040. In SK domain 1040, security kernel 1021 may control all virtual-to-physical memory mappings, and may control what areas of physical memory are accessible to external devices. However, Security Kernel 1021 may rely on the OS kernel's process creation functions, including normal mode virtual memory mappings, initial mapping of HSA memory and loading of HSA code and data sections. Security Kernel 1021 may however monitor every such mapping to ensure that there is no unauthorized mapping of trusted memory into untrusted virtual spaces. Thus, Security Kernel 1021 may regard all areas of memory that are not trusted as untrusted. Further, Security Kernel 1021 may regard all running program code that is not controlled by Security Kernel 1021 to be untrusted. It is noted that in one embodiment, Security Kernel 1021 may be a stand-alone code segment which may be a patch to an existing OS. In alternative embodiments, Security Kernel 1021 may be a module or code segment within and part of a given OS.

Major functions of SEM include placing the system in the trusted environment by initializing the processor to run in SEM, verifying the authenticity of the SK, and protecting the trusted environment from outside attacks. It is noted that the terms CPU, microprocessor and processor may be used interchangeably. Thus, one of the main features of SEM is that SEM protections may be reliably enabled after the system is up and running. In one embodiment, there may be no requirement to change the typical x86 platform boot process. SEM protections may typically be turned on by a system software component that, for the purposes of this document, is referred to as an SEM driver (not shown). The SEM driver may be independent from the OS kernel, but run in kernel mode, much like any device driver. The SEM driver may launch the SKINIT instruction, thereby initializing the SK as described further below.

Central to creating a trusted PC is a unique, platform specific, secret. In practice, this secret may be the private half of a public/private cryptographic key pair. The secret must only be used when the PC is operating within the trusted environment, and it must never be revealed to anyone—or any code. The results of cryptographic operations using the secret can be revealed, but not the secret itself. For this to work, the secret and the cryptographic processing machinery that uses it must exist in a closed box with controlled inputs and outputs. In practical terms, a closed box refers to a single integrated circuit (IC) package that combines processing capability and nonvolatile storage. This device is referred to as a Security Services Processor (SSP). In one embodiment, at least one SSP is required and exactly one SSP participates in the platform initialization process.

Architecturally, the SSP may be located anywhere in the platform. The only requirement is that a non-spoofable and secure communication path exist between the SEM-capable processor and the SSP. As used herein, a non-spoofable communication path between the SEM-capable processor and the SSP refers to a secure communication path in which the SSP does not receive commands from either software executing outside of the trusted environment or from DMA hardware. This may be especially complicated when the trusted environment is being initialized. Here, the SSP must verify the validity of the SK and be certain that the SK that is being validated is actually the code running at that instant on the SEM-capable processor. The validation takes the form of a cryptographic hash of the SK image. This hash must be delivered to the SSP in a manner that could not have resulted from the operation of normal software. Further, the SEM-capable processor must begin execution of the SK from a clean initialization state (and the SSP must know this). These requirements may be met by using CPU microcode and hardware mechanisms that are unavailable to normal software. A specific feature of the SEM-capable processor, the Security Kernel Initialization (SKINIT) instruction, is used to perform various security initialization functions such as reinitializing the SEM-capable processor, verifying that other processors in an MP system are stopped, and communicating with the SSP using reserved system addresses and unique bus transactions and jumping into the SK code, for example. It is noted that in one embodiment, the SKINIT instruction is a single instruction having multiple microcode components that execute atomically. As used herein, to execute atomically refers to executing to completion in a specified order without interruption. It is further noted that in one embodiment, the initialization process includes two steps: the validation of a small Secure Loader (SL) by the SSP, followed by the validation of the much larger SK.

Computer System Employing a Trusted Computing Platform

Figure 2:
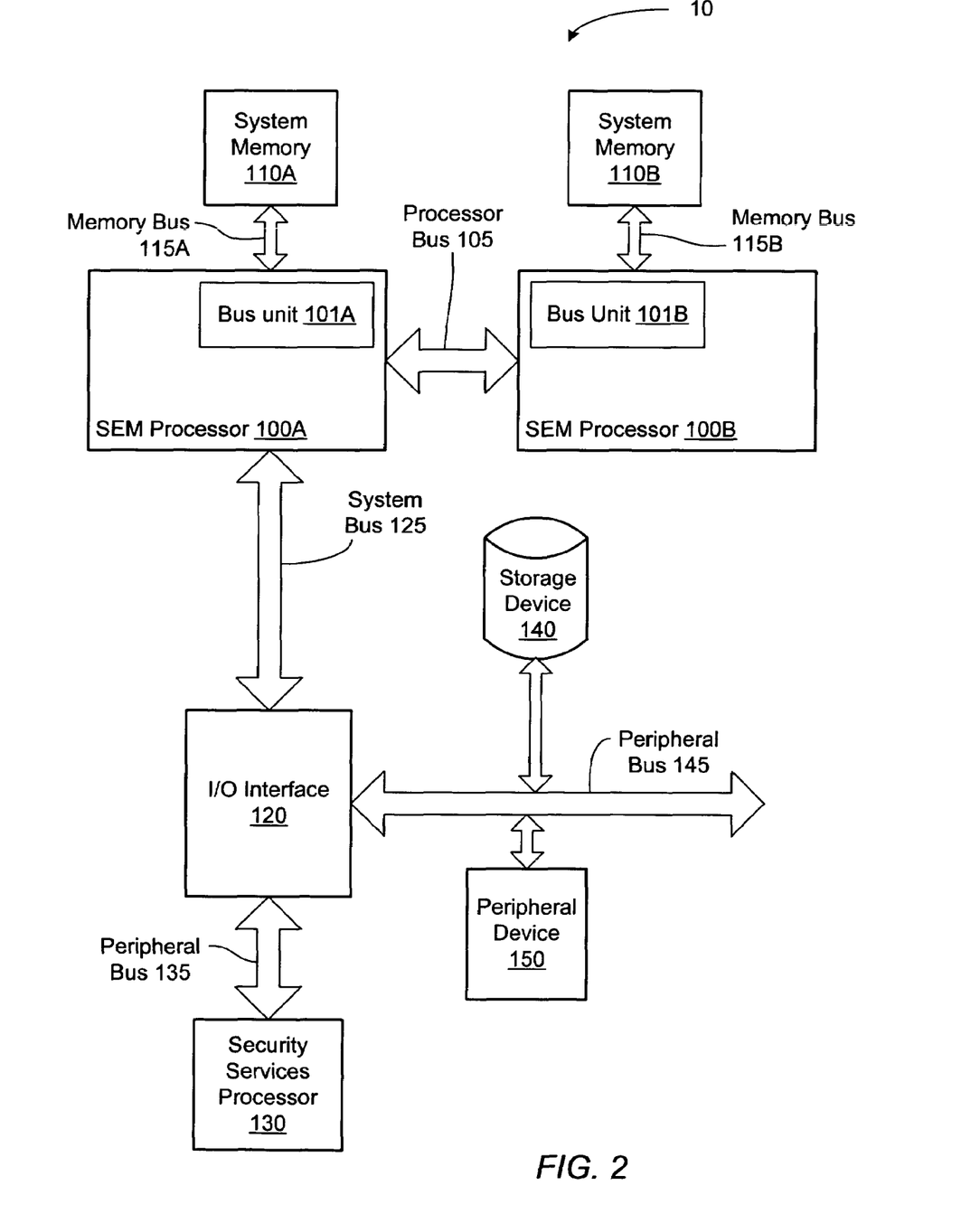
FIG. 2 is a block diagram illustrating one embodiment of a computer system employing a trusted computing platform.

Referring to FIG. 2, a block diagram of one embodiment of a computer system employing a trusted computing platform is shown. Computer system 10 includes two SEM capable processors designated SEM processor 100A and SEM processor 100B. SEM processor 100A is coupled to SEM processor 100B via a processor bus 105. Computer system 10 also includes a system memory 110A which is coupled to SEM processor 100A and a system memory 110B which is coupled to SEM processor 100B. SEM processor 100A is coupled to an I/O interface 120 via a system bus 125. It is noted that in alternative embodiments, system memories 110 may be connected to I/O interface 120. I/O interface 120 is coupled to a storage device 140 and to a peripheral device 150 via a peripheral bus 145. I/O interface 120 is further coupled to SSP 130 via peripheral bus 135. In an alternative embodiment, instead of peripheral bus 135, SSP 130 may be coupled to peripheral bus 145. It is noted that although two SEM processors are shown, other embodiments may include other numbers of SEM processors. It is also noted that components having the same reference number and a letter may be referred simply to by the reference number alone. For example, SEM processor 100A may be referred to simply as SEM processor 100 where appropriate.

SEM processor 100 is illustrative of a processor employing the x86 architecture. For example, in one embodiment, SEM processor 100 may be an Athlon™ processor by Advanced Micro Devices, Inc. As such, SEM processor 100 is configured to execute x86 instructions which may be stored in system memory 110 or storage device 140. In the illustrated embodiment, SEM processor 100 may include security hardware (not shown in FIG. 2) that, when enabled by SEM, provides support for SEM operating modes such as the trusted execution (TX) mode described above in conjunction with the description of FIG. 1, for example. As will be described in greater detail below in conjunction with the description of FIG. 3 and FIG. 4, SEM processor 100 may also include hardware (not shown in FIG. 2) that may protect system resources such as certain control registers and MSRs, upon exiting the system management mode (SMM).

In the illustrated embodiment, SEM processor 100A and SEM processor 100A each include a bus interface unit designated bus unit 101A and 101B, respectively. As will be described in greater detail below, bus unit 101 includes security hardware (not shown in FIG. 2) that, during SMM operation, may protect selected addresses of system memory 110 from unauthorized access.

System memory 110 is configured to store program instructions and data that is frequently used by SEM processor 100. In a typical system configuration, storage device 140 may be used to more permanently store the program instructions and data and as SEM processor 100 needs the data and program code, it may be transferred to system memory 110. Additional support for SEM operating modes may be provided by the security kernel which may be executed in conjunction with the OS out of system memory 110 during operation of SEM processor 100. In addition, system memory 110 may be partitioned into a trusted portion and an untrusted portion. The security kernel resides in the trusted portion of system memory 110. As described above, system memory 110 is typically accessed using paged virtual memory. In such an arrangement, physical addresses in system memory 110 may be accessed by individual pages or chunks of memory. This paging function is typically handled by OS memory management functions.

In one embodiment, system memory 110 may be implemented using a plurality of memory chips implemented in dynamic random access memory (DRAM) technology or in one of the varieties of DRAM technologies available, such as synchronous DRAM (SDRAM), for example. The DRAM chips are typically mounted on small circuit boards having an edge connector which are inserted into a socket connector on a motherboard. Depending on the configuration of the boards, they may be referred to as either single or dual in-line memory modules (e.g. SIMMs or DIMMs, respectively). System memory 110 may include multiple banks of memory modules which may allow memory expansion.

As described above, storage device 140 may store program code and data. In one embodiment, storage device 140 may be a hard disk drive or a bank of hard disk drives, although other embodiments are contemplated that include other mass storage devices such as CD-ROM drives, floppy disk drives and tape drives, for example.

Peripheral device 150 may be any peripheral device such as a modem, video capture device or other general purpose input output device, for example. It is noted that in other embodiments, other numbers of peripheral devices may be used.

I/O interface 120 may be configured to provide bus control and translation for transactions between different peripheral buses and SEM processors 100A and 100B during normal system operation. In one embodiment, I/O interface 120 may perform functions associated with a Northbridge. For example, peripheral bus 145 may be a peripheral component interconnect (PCI) bus and peripheral bus 135 may be a low pin count (LPC) bus. In addition, I/O interface 120 may be configured to determine whether an SSP is connected to it and to which bus and to allow non-spoofable communication to occur between SEM processor 100 and SSP 130 during a secure initialization. I/O interface 120 may also be configured to recognize SKINIT related messages and transport those messages to SSP 130 in the specific format of peripheral bus 135.

Overview of System Management Mode (SMM)

Computer systems, such as computer system 10, generally provide for specialized device management software to execute beyond the scope of the Operating System, transparently to the OS kernel and applications. In one embodiment, this mode of operation may for example enable computer system 10 to save and restore its internal processor state, such as the contents of various registers, using external memory or disk in preparation for entering a power-saving suspended state. This mode of operation is referred to as System Management Mode (SMM).

SMM generally makes use of a small region of hidden SMM memory, which only becomes active when the processor enters SMM in response to a System Management Interrupt (SMI). In one embodiment, SMM memory may be a region of system memory 110, while in another embodiment SMM memory may be located in a memory (not shown) separate from system memory 110. A conventional processor unconditionally enters SMM in response to an SMI assertion, suspending whatever was executing prior to the SMI assertion. Upon entry to SMM via an SMI, conventional processors generally enter real mode, whereby virtual memory paging and Protected mode are disabled. Using physical memory addresses, essential internal processor state including, for example, general purpose register contents, is then stored in a special area of SMM memory called the State Save Map (SSM), which is also referred to as the SMM Save Area. Once the internal processor state is saved, the processor may enter a suspended state. To resume normal operation, SMM is exited via an RSM instruction. Executing the RSM instruction causes the data in the State Save Map to be read and the internal computing state to be restored.

In conventional processors there is no provision for the OS kernel to disable SMI; it may assert and cause execution to switch to SMM at any time. This operation may pose several security issues in a trusted computing environment. For example, if an SMI assertion were to occur while an SEM-capable processor is processing secure information in trusted execution mode, such secure information could be compromised when the trusted execution mode internal processor state is saved upon entry into the SMM operation. In addition, since memory accesses generated during SMM operation are not required to use virtual memory paging, the protections associated with virtual memory paging may not be enforced, and the physical addresses used during SMM operation may compromise trusted system data. Further, the RSM instruction could compromise SEM features if SMM operation were to tamper with the contents of the Save State Map.

As will be described in greater detail below in conjunction with the descriptions of FIG. 3 and FIG. 4, in one embodiment SEM processor 100 includes hardware (not shown in FIG. 2) that may provide protection against accesses to system memory during operation in System Management Mode.

SEM Hardware Support During SMM Operation

Figure 3:
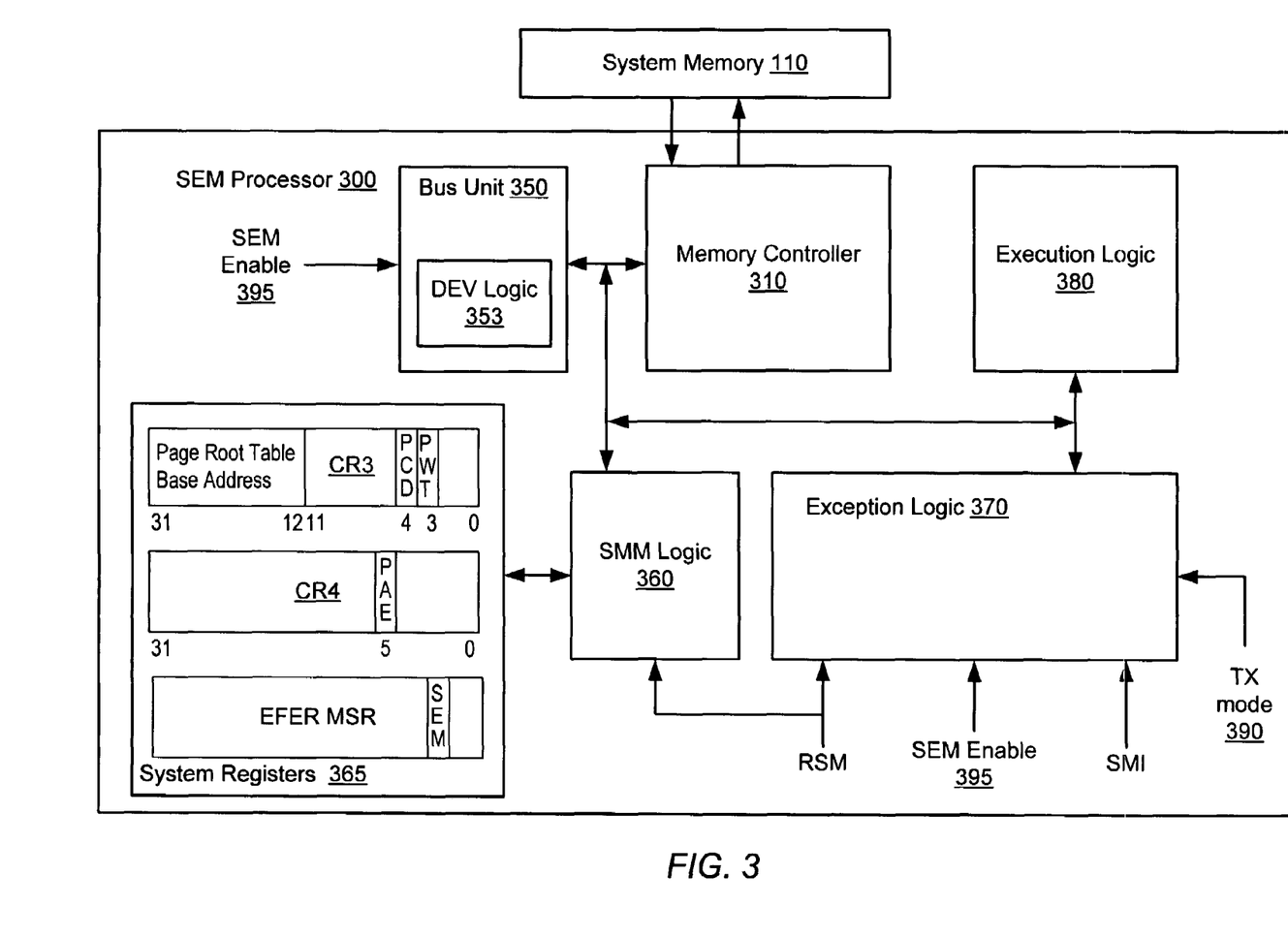
FIG. 3 is a block diagram of one embodiment of a system including an SEM processor and a system memory.

Turning to FIG. 3, a block diagram of one embodiment of a system including an SEM processor and a system memory is shown. SEM processor 300 is coupled to a system memory 110. SEM processor 300 includes a bus unit 350, a memory controller 310, SMM logic 360, exception logic 370, and execution logic 380, interconnected to one another via a variety of interconnect mechanisms. In addition, SEM processor 300 includes system registers 365 which are coupled to SMM logic 360. It is noted that SEM processor 300 may be illustrative of SEM processor 100A or 100B of FIG. 2 and bus unit 350 may be illustrative of bus unit 101 of FIG. 2. In one embodiment, memory controller 310 may be configured to process access requests to system memory 110 originating from execution logic 380 or SMM logic 360. As will be described further below, bus unit 350 may be configured to process memory access requests for exception processing from exception logic 370 and to send exception information corresponding to access requests to exception logic 370. Execution logic 380 may be configured to execute code in a pipelined fashion.

In the illustrated embodiment, exception logic 370 is coupled to receive the SMI interrupt signal that may be indicative that an SMI interrupt has been requested. Exception logic 370 is also coupled to receive a TX mode signal 390 that may be indicative of whether SEM processor 300 is in TX mode. In one embodiment, TX enable signal 390 may be derived from a TX enable bit that may be asserted upon entry into TX mode and deasserted upon exit from TX mode. The TX enable bit may reside in a designated control register not visible to software (not shown). Accordingly, in one embodiment, TX mode signal 390 may simply reflect the state of the TX enable bit; however, other embodiments are contemplated in which TX mode may be indicated differently. Exception logic 370 is also coupled to receive an SEM enable signal 395 that may be indicative of whether SEM processor 300 is in secure execution mode. In one embodiment, SEM enable 395 may be derived from the SEM enable flag of the EFER model specific register (MSR) that may be asserted upon entry into the secure execution mode. Exception logic 370 is also coupled to receive a RSM signal, which may be indicative the RSM instruction is being executed by execution logic 380.

Upon entry into SMM via the SMI interrupt, if SEM processor 300 is operating in SEM as indicated by SEM enable signal 395, and TX mode 390 indicates that SEM processor 100 is in TX mode, exception logic 370 may redirect the received SMI interrupt to a security exception handler for possible handling by the SK. In one embodiment, exception logic 370 may hold the SMI pending while the SK may store the TX mode internal processor state of SEM processor 300 to a trusted memory area. Once the TX mode processor state has been stored, the SK may return execution control back to the normal kernel mode. Exception logic 370 may detect the transition of SEM processor 300 from TX mode to normal kernel mode, unmask SMI interrupts, and cause execution logic 380 to vector to the pending SMI interrupt. Processing of the SMI may then proceed in normal kernel mode, whereby SEM processor 300 may enter SMM with the SEM protections described below enabled.

Memory Access Protection in SMM

Once the SEM processor 300 has entered SMM, bus unit 350 may prevent access to particular memory locations. In one embodiment, SMM logic 360 may be configured to issue access requests to system memory 110 corresponding to SMM save and restore operations. As discussed above, access requests generated during SMM operation may bypass the virtual memory paging mechanism and instead use physical addresses that may compromise trusted system data. To prevent both read and write access requests including instruction fetches generated during SMM operation from accessing trusted memory, an exclusion mechanism designated a DMA exclusion vector (DEV) may be used to selectively disable such requests.

In one embodiment, the DEV may be a contiguous array of bits located in system memory 110, which may be enabled and initialized by the SK and that may be referenced by bus unit 350 during operation of SEM processor 100. As described further below, access to the DEV may be controlled by DEV logic 353 shown bus unit 350. In one embodiment, each bit within the DEV may correspond to a single 4 KB page of the physical system memory address space, also referred to herein as a physical memory page or physical page. The first bit in the array corresponds to the first 4 KB page in physical memory, the second bit to the next page and so on. In this embodiment, the bits cover a total of 4 GB of physical address space, thus occupying 128 KB of contiguous physical memory (32 4 KB pages). However, in other embodiments, it is contemplated that the DEV may use different page sizes or an organization other than uniform pages and may cover a larger or smaller physical address space and thus the DEV array may include a different number of corresponding bits. Additionally, in other embodiments it is contemplated that the DEV may include a number of bits covering a subset of the physical pages in the physical address space.

In one embodiment, if a bit in the DEV is asserted, the physical page of system memory 110 associated with that bit may be protected against unauthorized SMM accesses. When SEM enable 395 is asserted and virtual memory paging is disabled, all system memory access requests may be checked against the DEV.

In one embodiment, DEV logic 353 may access the DEV bit in system memory 110 associated with the physical system memory page corresponding to a particular access request. In an alternative embodiment, a subset of the DEV corresponding to frequently or recently accessed system memory addresses may be cached in DEV logic 353 to reduce the number of additional system memory access requests required to access the DEV, thereby increasing system performance. In another embodiment, the entire DEV may be stored in DEV logic 353, thereby eliminating the need to generate additional system memory access requests to access the DEV. In yet another embodiment, a subset of DEV bits may be cached in the translation lookaside buffer (TLB) (not shown) entries of SEM processor 300 when virtual memory paging is disabled.

In one embodiment, if the DEV bit associated with the physical page being accessed is deasserted, the access may be allowed to proceed. If the DEV bit is asserted, the access may be prevented from proceeding and DEV logic 353 may direct exception logic 370 to generate a security exception. In one embodiment, exception logic 370 may be configured to convey an indication of the source of the security exception, for example a memory fault, in an exception frame (not shown) generated on the system stack in response to the processing of the security exception by execution logic 380. In another embodiment, exception logic 370 may be configured to store an indication of the source of the security exception in a status storage such as register, for example (not shown). It is noted that code executed in SMM may switch SEM processor 300 into protected mode. In this case, DEV logic 353 may still protect access to system memory 110 as described above.

System Register Protection in SMM

In addition, as will be described further below, code executed in SMM may have access to modes and features which would compromise SEM if unchecked. For example, SMM code may enable paging. To fully control address translation (particularly when paging is enabled), the SK must be able to limit normal mode code to the table hierarchies that the SK knows to be safe (i.e. they do not map any trusted pages). This will typically be the various sets of translation tables that the OS will have built up under the watchful eye of the SK for the various normal mode applications that are active. At a minimum, this limitation may be enforced by having SEM processor 300 generate a security exception on any attempt by SMM code to load CR3, allowing the SK to examine the input operand and determine whether it points to a legitimate root table. Accordingly, only the root page tables defined in a trusted mode data structure called a root page vector (RPV) (not shown), which is controlled by the SK, may be accessed, thereby protecting trusted memory pages from unauthorized memory accesses.

In one embodiment, the RPV may be a contiguous array of bits located in system memory 110, which may be initialized and maintained by the SK. The RPV array may be treated as a vector including one bit for each page in physical memory. Each bit within the RPV may correspond to a single 4 KB page of the physical system memory address space. For example, if a bit within the RPV is asserted, it means that a respective page in memory is a valid root table page. The RPV may be accessed by either software or hardware. It is noted that although each bit of the RPV corresponds to a 4 KB page, in other embodiments, it is contemplated that the RPV may use different page sizes or an organization other than uniform pages and may cover a larger or smaller physical address space and thus the RPV array may include a different number of corresponding bits.

Since SMM code may attempt to access trusted memory by loading new value to CR3, as described further below, any CR3 writes may be checked while SEM processor 300 is operating with SEM enabled. SMM code may also attempt to write to CR4; however, writes to CR4 may not be allowed during SMM and may cause a security exception. Security exceptions that occur in SMM may cause either an IDT Security Exception (SX) or a SK Intercept (SKI) dependent upon whether SEM processor 300 is operating in Native Kernel Mode (e.g., CPL0 with paging enabled) or not.

Generally speaking, a security exception is an exception which when generated, may be handled by the Interrupt Descriptor Table (IDT) mechanism (e.g., #SX) using a predetermined interrupt vector or by other exception handling logic that transfers control directly to the SK (e.g., #SKI). For example, in one embodiment, if SEM processor 300 is operating in Native kernel mode or normal kernel mode when a security exception is generated, the SK may directly handle the security exception via the #SKI. Alternatively, if SEM processor 300 is operating in a user mode such as normal user mode, security logic 101 may cause a security exception to be generated and the IDT mechanism may handle the security exception as it would any other IDT-based exception, using a predetermined interrupt vector (#SX) specific to the security exception. The IDT mechanism may then pass the exception to the OS kernel mode handler for that vector which may in turn pass the exception to the SK using whatever software conventions may be employed for OS communication with the SK. However, since control registers may typically only be accessed in modes such as Native kernel mode, the #SKI may typically handle the CR3 and CR4 load exception.

In one embodiment, exception logic 370 may be configured to perform write checking of control register CR3 when SEM processor 300 is operating in SMM and SEM enable signal 395 is asserted. Exception logic 370 may be configured to monitor all accesses to CR3 during SMM. If a read access is detected, the read access to CR3 may be allowed to proceed.

Typically, the contents of CR3 may be modified using a MOV CR3 instruction or a control transfer via a task gate. The MOV instruction is a type of load instruction where data may be loaded into a destination operand, which in this case is control register CR3. A task gate is a gate used to control access between code segments between tasks. A task gate may also be used to transfer control to an interrupt-service routine (ISR) if the ISR is also a task. A detailed description of task gates may be found in the AMD™ x86-64 Architecture Programmer's Manual Volume 2.

However, in response to detecting a write access to CR3, exception logic 370 may selectively inhibit or prevent the write access. Dependent upon specific hardware implementations, in one embodiment, exception logic 370 may generate an unconditional security exception in response to a write to CR3. However in alternative embodiments, a root vector enable (RVE) flag bit (not shown) may control whether exception logic 370 may reference or query the RPV to determine whether to generate an unconditional security exception upon detection of a write access to CR3, thereby effectively filtering write accesses to CR3.

In embodiments which use the RVE flag, if the RVE flag is enabled, CR3 write checking may be enabled. In response to detecting a write access request to CR3, exception logic 370 may be configured to reference the RPV prior to generating a security exception. For example, the root table base address field (sometimes referred to as the Page Frame Number (PFN)) of a proposed MOV CR3 instruction may be read and used as an index or pointer into the RPV. The RPV may be accessed and the bit corresponding to the index is checked to ensure that the corresponding page in system memory 110 is a legitimate root table page. Thus, if the bit is asserted, the page is a valid root page. If the bit in the RPV is found to be deasserted, indicating the page is not a valid root page, the load of CR3 may not be allowed to proceed (i.e. the CR3 load is inhibited). Exception logic 370 may cause a CR3 load security exception to be generated.

In addition to checking the root table base address during a proposed CR3 write access, the control flag settings of the proposed CR3 load may also be checked by exception logic 370. For example, in one embodiment, the PCD and PWT flags should both be zero in a proposed load of CR3. If the proposed CR3 flags are clear and the page pointed to by the RPV bit is a valid root page, the load of CR3 may be allowed to proceed.

In one embodiment, during a CR3 load security exception, the SK may set the RPV bit and return to the instruction that caused the exception, which may then execute to completion. In an alternative embodiment, the SK may allow the load to complete via emulation without setting the RPV bit and return to the instruction following the instruction that caused the exception. In various other embodiments, it is contemplated that the SK may abort the code sequence as necessary.

Hardware Support for the RSM Instruction

As described above, to return from SMM, an RSM instruction is executed. In response to the execution of the RSM instruction, SMM logic 360 may request a read of the data in the State Save Map and may restore the internal computing state. In conventional processors, the RSM instruction may allow certain register values to be changed from the values that were stored upon entry into SMM. However, the behavior of an RSM instruction that is executed in SEM processor 300 may be altered. For example, as will be described in greater detail below, the contents of the CR4 register and the EFER MSR may not be changed from their values at entry to SMM. Further, the value in CR3 may be checked to determine if it is a trusted value.

As described above, execution of RSM may cause the CR3 value to be restored. However, exception logic 370 may check the proposed CR3 value in response to the execution of the RSM instruction. Therefore, if the CR3 load violates any of the write checking rules described above, the RSM instruction execution may be inhibited by a security exception. In one embodiment, exception logic 370 may cause the security exception to be generated in response to an RSM instruction results in a CR3 load violation.

The Physical Address Extension (PAE) bit in CR4 controls the size of the page table entries. Since the view of the page tables by SEM processor 300 must not be changed, PAE may not be changed from its original value prior to entering SMM. As described above, writes to CR4 during SMM are not allowed. In addition, to ensure that the contents of CR4 remain unchanged across an SMI assertion and subsequent RSM, CR4 is not restored by SMM logic 360 in response to execution of the RSM instruction.

The EFER MSR is not restored by SMM logic 360 in response to execution of the RSM instruction when SEM is enabled. In one embodiment, the contents of the EFER image in the SMM Save Area are ignored, and thus may not cause a security exception. The flags of the EFER MSR may be not altered when SMM is entered, and they may be preserved during SMM execution if SK has disabled write access to the EFER MSR via an MSR Protection Bitmap (not shown). However, in one embodiment, when SEM is not enabled, the EFER MSR may be restored, with the exception of the SME bit; the SEM cannot be enabled via RSM. In one embodiment, the SME bit in the State Save Map EFER image must be zero, or RSM may cause SEM processor 300 to shut down.

In one embodiment, the MSR Protection Bitmap (not shown) may be implemented as a trusted mode data structure which may reside in trusted system memory of system memory 110. The SK may be responsible for creating and maintaining the MSR Protection Bitmap. In one embodiment, the MSR Protection Bitmap may be referenced by a WRMSR instruction which is executed when SEM processor 300 is CPL0. The WRMSR instruction references the MSR Protection Bitmap to determine if the MSR being written is protected. In one embodiment, if the corresponding bit is asserted, the write is not performed and exception logic 370 may generate a security exception.

In one embodiment, the SK may respond to the security exception by determining which MSR is being written and examining the data being written. Further, the SK may complete the access with or without modifying the data, or disallow the write and return to the code sequence or simply abort the code sequence by returning to a normal mode error handling routine, for example.

In one embodiment, during normal operation, execution of the RSM instruction may cause SMM logic 360 to check the contents of certain registers (e.g., CR0 and CR4) in the State Save Map for illegal settings. Such illegal settings may cause SEM processor 300 to enter a shutdown state with CR0.PG and PE cleared, which places SEM processor 300 into Real Mode. In conventional processors, the EFER MSR is normally cleared when entering the shutdown state. However, in one embodiment, if the EFER.SME is set when entering the shutdown state in SEM processor 300, it will remain set, thereby ensuring that if SEM processor 300 is brought out of the shutdown state by an INIT, the SEM protections may still be enabled.

Generally speaking, any attempt to access an SEM-protected resource while SMM is active and SEM processor 300 is not in protected mode with paging enabled, regardless of privilege level, may cause a security exception. Depending upon the specific implementation of the security exception handler, SEM processor 300 may enter the shutdown state. Alternatively, depending upon the nature of the security exception, the security exception handler may return to the interrupted SMM. Further, it is contemplated that the security exception handler may cause the RSM instruction to be executed thereby exiting SMM.

Figure 4:
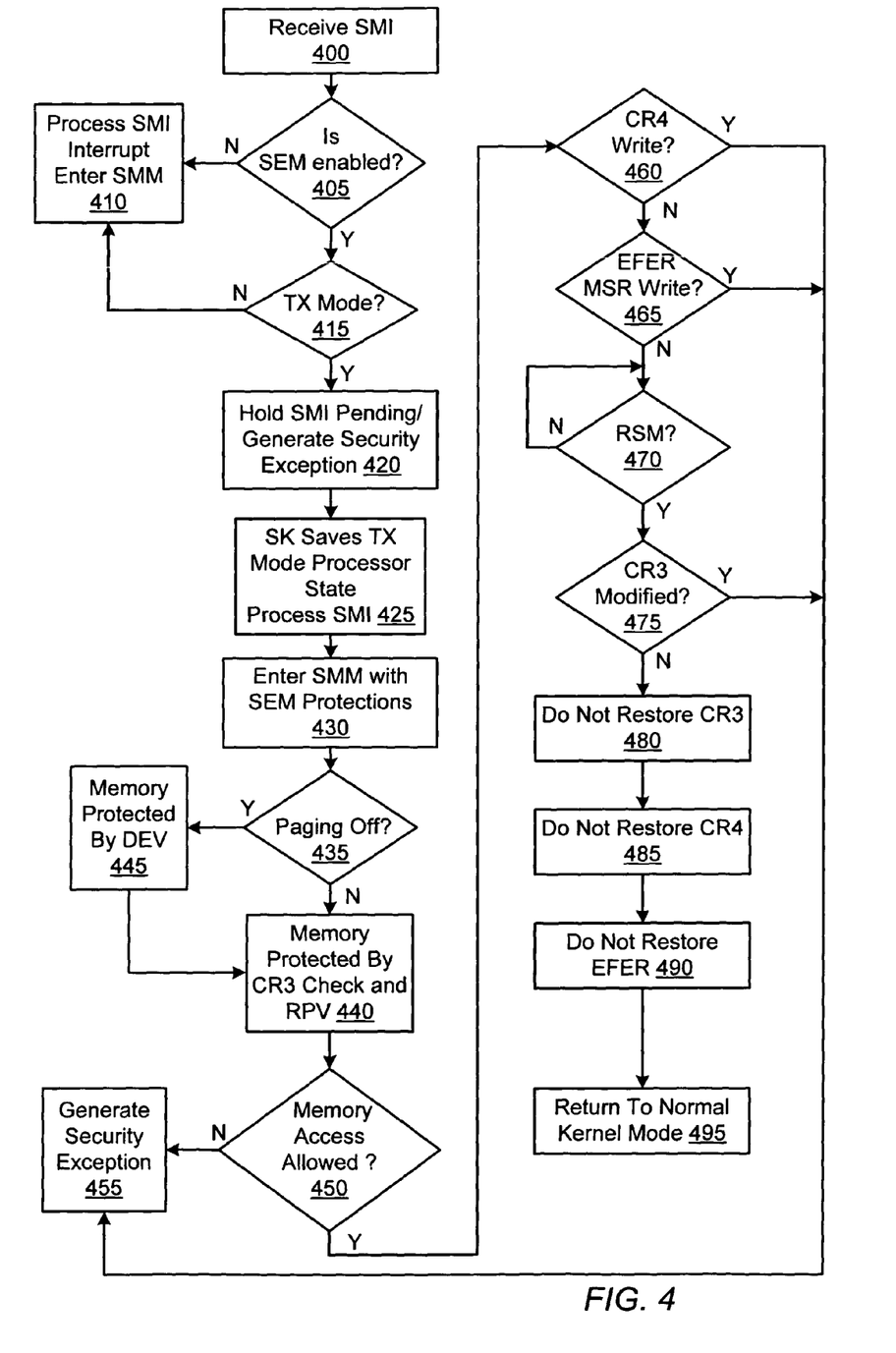
FIG. 4 is a flow diagram describing the operation of one embodiment of an SEM processor during operation in system management mode in a trusted computing platform.

FIG. 4 illustrates a flow diagram describing the operation of one embodiment of a SEM processor during operation in system management mode in a trusted computing platform. Referring collectively to FIG. 1 through FIG. 4, operation begins in block 400 where an SMI interrupt is detected by exception logic 370. Based on the status of SEM enable 395, exception logic 370 determines whether the SEM features of SEM processor 300 are enabled (block 405). If SEM features are not enabled, exception logic 370 allows the normal processing of the SMI to proceed, whereby SEM processor 300 enters SMM as described above (block 410).

Referring back to block 405 if SEM features are enabled, exception logic 370 determines whether SEM processor 300 is in TX mode based on the status of TX mode signal 390 (block 415). If SEM processor 300 is not in TX mode, exception logic 370 allows the normal processing of the SMI to proceed, whereby SEM processor 300 enters SMM as described above (block 410).

Referring back to block 415, if SEM processor 300 is in TX mode, exception logic 370 may hold the detected SMI interrupt in a pending state, mask further SMI interrupts from being detected, generate a security exception, and cause execution logic 380 to begin processing the security exception. In one embodiment, execution logic 380 may create an exception frame (not shown) on the SK stack including information corresponding to the security exception, for example, an indication that the source of the security exception is an SMI interrupt (block 420).

Execution logic 380 may transfer execution control to the SK. In one embodiment, when the SK receives the security exception for processing, it may store the TX mode internal processor state of SEM processor 300 to a trusted memory area. Once the TX mode processor state has been stored, the SK may return execution control back to the normal kernel mode. Exception logic 370 may detect the transition of SEM processor 300 from TX mode to normal kernel mode, unmask SMI interrupts, and cause execution logic 380 to vector to the pending SMI interrupt (block 425). The SK may then transition out of TX mode, whereby processing of the SMI may then proceed in normal kernel mode. SEM processor 300 enters SMM with the SEM protections enabled and in Real mode (block 430).

Once SEM processor 300 enters SMM mode, SMM code may transition to protected mode, therefore exception logic 370 may determine if paging is enabled (block 435). If paging remains off, memory accesses may be directly protected by the DEV mechanism as described above in conjunction with the description of FIG. 3 (block 445). In addition, memory accesses may be indirectly protected by inhibiting certain CR3 loads using the CR3 write checking and the RPV as described above in conjunction with the description of FIG. 3 (block 440).

Referring back to block 435, if paging is turned on by SMM code, memory accesses may be protected by preventing access to the address translation hierarchy by inhibiting certain CR3 loads using the CR3 write checking and the RPV as described above in conjunction with the description of FIG. 3 (block 440).

If a memory access is inhibited by the DEV mechanism or a CR3 load is inhibited by the CR3 write checking mechanism (block 450), a security exception may be generated. As described above, the SMM security exception handler may, in one embodiment, cause SEM processor to go into a shutdown state (block 455).

Exception logic 370 may also protect against writes to control register CR4. If a write to CR4 is detected (block 460), exception logic 370 may generate a security exception as described above at block 455. If there is an attempt to write to the EFER MSR, exception logic 370 may detect the write (block 465) and generate a security exception since writes to certain MSRs are inhibited by the SK using a protected MSR bitmap as described above in conjunction with the description of FIG. 3 (block 455).

SMM code may perform operations normally associated with SMM with the SEM protections described above. As described above, to exit SMM, an RSM instruction may be executed. In one embodiment, in response to detecting the execution of the RSM instruction (block 470), SMM logic 380 may read the State Save Map from system memory 110 to restore the internal processor state. Exception logic 370 may cause a CR3 check to be performed by comparing the contents of CR3 to the CR3 value stored in the State Save Map to ensure that the CR3 value stored in the State Save Map have not been modified (block 475). If the contents have been modified, exception logic 370 may generate a security exception as described above (block 455). If however the contents of CR3 have not been modified (block 475), there is no need to restore the CR3 contents with the version read from the State Save Map (block 480).

Further, exception logic 370 inhibits the CR4 register from being restored from the version read from the State Save Map (block 485) as described above in conjunction with the description of FIG. 3. Likewise, with SEM protections enabled, exception logic 370 inhibits the EFER MSR from being restored from the version read from the State Save Map (block 490).

If the SEM protections described above have been satisfied the exception logic 370 may allow execution logic 380 to complete execution of the RSM instruction, thereby returning SEM processor 300 to Normal kernel Mode (block 495).

In the foregoing discussions, the term "asserted" refers to a logic 1 value, and the term "deasserted" refers to a logic 0 value. However, in other embodiments, it is contemplated that these values may be reversed for any given bit.

It is noted that some elements may be described as being implemented in hardware while other elements may be described as being implemented in software merely as a convenience to convey the operational characteristics of the system and its various components. However, it is contemplated that in various implementations, some or all of the hardware elements described above may be implemented in software and some or all of the software elements described above may be implemented in hardware or a combination of both.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for controlling a secure execution mode-capable processor, said method comprising:
    receiving access requests to a plurality of addressable locations within a system memory;
    organizing said plurality of addressable locations into a plurality of physical pages;
    maintaining a data structure including a plurality of bits, wherein each of at least a subset of said plurality of physical pages corresponds to a respective one of said plurality of bits; and
    preventing said access requests, to particular ones of said physical pages, from completing in response to determining that corresponding respective bits of said plurality of bits are asserted, that said secure execution mode-capable processor is operating in a secure execution mode, and that said secure execution mode-capable processor is operating in a system management mode with system paging disabled.

2. The method as recited in claim 1 further comprising allowing said access requests to complete in response to determining that said secure execution mode-capable processor is not operating in said a secure execution mode.

3. The method as recited in claim 1, further comprising caching a subset of said plurality of bits in a plurality of translation lookaside buffer entries of said secure execution mode-capable processor in response to said secure execution mode-capable processor operating in a system management mode with system paging disabled.

4. The method as recited in claim 1, further comprising allowing said access requests to particular ones of said physical pages from completing in response to determining that corresponding respective bits of said plurality of bits are asserted and that said secure execution mode-capable processor is a source of said access requests.

5. The method as recited in claim 1 further comprising generating a security exception in response to preventing said given access request.

6. A secure execution mode-capable processor comprising:
    an execution unit configured to execute instructions;

a bus unit coupled to said execution unit and configured to maintain a data structure including a plurality of bits, wherein each of at least a subset of a plurality of physical pages of a system memory corresponds to a respective one of said plurality of bits; and an exception unit coupled to said execution unit and configured to:
receive notification of access requests to a plurality of addressable locations within a system memory;
prevent said access requests, to particular ones of said physical pages, from completing in response to determining that corresponding respective bits of said plurality of bits are asserted, that said secure execution mode-capable processor is operating in a secure execution mode, and that said secure execution mode-capable processor is operating in a system management mode with system paging disabled.

7. The secure execution mode-capable processor as recited in claim 6, wherein the exception unit is further configured to allow said access requests to complete in response to determining that said secure execution mode-capable processor is not operating in said a secure execution mode.

8. The secure execution mode-capable processor as recited in claim 6, wherein the bus unit is configured to cache a subset of said plurality of bits in a plurality of translation lookaside buffer entries of said secure execution mode-capable processor in response to said secure execution mode-capable processor operating in a system management mode with system paging disabled.

9. The secure execution mode-capable processor as recited in claim 6, wherein the exception unit is further configured to allow said access requests to particular ones of said physical pages from completing in response to determining that corresponding respective bits of said plurality of bits are asserted and that said secure execution mode-capable processor is a source of said access requests.

10. The secure execution mode-capable processor as recited in claim 6, wherein the exception unit is further configured to generate a security exception in response to preventing said given access request.

11. A system comprising:
a system memory including a plurality of addressable locations organized into a plurality of physical pages; and
a secure execution mode-capable processor coupled to said system memory and configured to operate in a secure execution mode, wherein said secure execution mode-capable processor includes:
execution unit configured to execute instructions;
a bus unit coupled to said execution unit and configured to maintain a data structure including a plurality of bits, wherein each of at least a subset of said plurality of physical pages corresponds to a respective one of said plurality of bits; and
exception unit coupled to said execution unit and configured to receive notification of access requests to one or more of said plurality of physical pages within a system memory; and
wherein said exception unit is further configured to prevent said access requests, to particular ones of said physical pages, from completing in response to determining that corresponding respective bits of said plurality of bits are asserted, that said secure execution mode-capable processor is operating in a secure execution mode, and that said secure execution mode-capable processor is operating in a system management mode with system paging disabled.

12. The system as recited in claim 11, wherein the exception unit is further configured to allow said access requests to complete in response to determining that said secure execution mode-capable processor is not operating in said a secure execution mode.

13. The system as recited in claim 11, wherein the bus unit is configured to cache a subset of said plurality of bits in a plurality of translation lookaside buffer entries of said secure execution mode-capable processor in response to said secure execution mode-capable processor operating in a system management mode with system paging disabled.

14. The system as recited in claim 11, wherein the exception unit is further configured to allow said access requests to particular ones of said physical pages from completing in response to determining that corresponding respective bits of said plurality of bits are asserted and that said secure execution mode-capable processor is a source of said access requests.

15. The system as recited in claim 11, wherein the exception unit is further configured to generate a security exception in response to preventing said given access request.

* * * * *